(12) United States Patent
Mohr (10) Patent No.: US 8,553,848 B1
(45) Date of Patent: Oct. 8, 2013

(54) PRESERVING VOLTAGE ON TELEPHONE LINE OVER HARD RESET DURING PLANNED OUTAGE

(75) Inventor: William J. Mohr, Cumming, GA (US)

(73) Assignee: ARRIS Enterprises, Inc., Suwanee, GA (US)

(*) Notice: Subject to any disclaimer, the term of this patent is extended or adjusted under 35 U.S.C. 154(b) by 103 days.

(21) Appl. No.: 13/223,633

(22) Filed: Sep. 1, 2011

Related U.S. Application Data (60) Provisional application No. 61/379,943, filed on Sep. 3, 2010.

(51) Int. Cl.
- *H04M 1/24* (2006.01)
- *H04M 3/08* (2006.01)
- *H04M 3/22* (2006.01)

(52) U.S. Cl.
USPC ............. 379/23; 379/9.02; 379/31; 379/343; 379/399.01; 379/413

(58) Field of Classification Search
USPC ............. 379/1.01, 9, 9.02, 9.05, 9.06, 22.06, 379/27.06, 27.07, 29.01, 29.03, 29.11, 32.01, 379/379/401, 413, 413.02, 413.03, 414, 22.02, 379/23, 31, 29.04, 343, 399.02, 404
See application file for complete search history.

(56) References Cited

U.S. PATENT DOCUMENTS

| | | | | |
|---|---|---|---|---|
| 4,361,730 A | * | 11/1982 | Barber et al. | 348/14.01 |
| 8,259,929 B2 | * | 9/2012 | Hinman et al. | 379/413 |
| 8,338,981 B2 | * | 12/2012 | Biegert | 307/3 |
| 2001/0043568 A1 | * | 11/2001 | Mchale et al. | 370/254 |
| 2007/0127713 A1 | * | 6/2007 | Schley-May et al. | 379/413.02 |
| 2011/0176807 A1 | * | 7/2011 | Biegert | 398/58 |

* cited by examiner

*Primary Examiner* — Binh Tieu
(74) *Attorney, Agent, or Firm* — Troy A. Van Aacken (57) ABSTRACT

Systems and methods can provide for preventing a false alarm generated during a planned network outage during a maintenance window. Security systems can generate and report alarms to a security center through a communications network. Intruders are known to disable the communication network thereby preventing reporting of an alarm to the security center. Security systems can generate local alarms upon detecting loss of the communications network. It is advantageous for a communications network operator to prevent false alarm generation during periods of planned network outages.

20 Claims, 5 Drawing Sheets

PRESERVING VOLTAGE ON TELEPHONE LINE OVER HARD RESET DURING PLANNED OUTAGE

RELATED APPLICATIONS

This application claims priority as a non-provisional utility of U.S. Provisional Patent Application Ser. No. 61/379,943, entitled "Preserving Voltage On Telephone Line Over Hard Reset During Planned Outage," filed Sep. 3, 2010, which is incorporated herein by reference in its entirety.

TECHNICAL FIELD

This disclosure relates to preventing an alarm trigger for a cable telephony line outage due to maintenance on a network.

BACKGROUND

Broadband services can be delivered via existing cable infrastructure from MSOs, digital subscriber lines (xDSL), integrated service digital network (ISDN), public switched telephone networks, or T1 connections from telecommunications operators or internet service providers, satellite from satellite operators, or wireless services (such as, e.g., cellular, 802.11 or Wi-MAX standards) from wireless service providers, among many others. Subscribers typically access multiple broadband communications devices (BCDs) at their location to provide such varied services.

One such device can receive information from and transmit information to termination systems (e.g., edge devices). The device can modulate and demodulate signals (modems) from termination systems and provide end users with the ability to access various networks. Examples of such BCDs include cable modems (CM), enhanced multimedia terminal adapters (i.e., eMTA), digital subscriber line (DSL) modems, wireless modems, set-top boxes (STB), and gateway devices, among others.

After a BCD is deployed into service, it typically has a relatively long operating life. BCDs are often powered by an external alternating current (AC) power source, one or more batteries, or combinations thereof.

Home alarm systems today are connected to the telephony inside wiring of a home. Such alarm systems are programmed to detect when telephone wires are severed, for example, when an intruder cuts the telephone wires entering the premises of a subscriber. In the case of a cable-based telephony network, the wires can be, for example, co-axial or fiber optic cable, entering the user's home from a local serving office, such as a cable head-end operated by a cable company. Cable companies are often referred to as Multiple System Operators (MSOs), and often provide to a subscriber cable television, video-on-demand, data and internet services, and IP telephony (VoIP) services. These services are accessed at a user's home through a transport access network that can include co-axial or fiber optic cables entering a user's premises. This cable connects with a BCD, which in turn is connected with the subscriber's existing telephone wiring in the home.

Home security systems are also coupled to a subscriber's existing in-home telephone wiring. A BCD in normal operation typically maintains a loop voltage on the telephone wiring. If the communication medium is not intact (e.g., cable has been cut resulting in the loss of the broadband communication device's input radio frequency signal), then the BCD is no longer able to achieve a lock onto a signal, and it will discontinue maintaining the loop voltage. When the home security system does not detect this loop voltage on the telephone wiring, the home security system can be programmed to send or sound an alarm indicating that the communication medium is not intact.

However, cable outages are expected due to planned maintenance on the cable system. During such planned outages, it is not desirable for a home alarm system to trigger an alarm. A system and method can be used to prevent the triggering of such an alarm.

SUMMARY

Systems and methods can operate to prevent false alarm generation during a planned network outage during a maintenance window. Systems can include an interface operable to provide a network connection, a demodulator operable to receive network signals and further operable to generate a network lock signal, a modulator operable to transmit network signals, one or more processors operable to process the network signals and provide control of a broadband communication device loop voltage management logic operable to provide loop voltage on a telephony line, and a board power supply operable to provide power to the broadband device from a first or second power source. Methods can include receiving a countdown value through a network; storing the countdown value in a nonvolatile storage; determining the condition of a network lock signal from a communication medium and performing the following steps if the network modulation lock signal is lost of retrieving the countdown value from the nonvolatile storage; using the countdown value retrieved from the nonvolatile storage and setting a maintenance time; continuing to apply a loop voltage to a telephony line if the maintenance time has not elapsed; and if the maintenance timer has elapsed, and if no network modulation signal has been locked onto, then discontinue applying the loop voltage.

BRIEF DESCRIPTION OF THE DRAWINGS

Many details of the disclosure can be better understood with reference to the following drawings. The modules in the drawings are not necessarily to scale, emphasis instead being placed upon clearly illustrating the principles of the preset disclosure.

DETAILED DESCRIPTION

In some implementations of this disclosure, systems and methods can operate to prevent the triggering of a "cable cut" alarm condition detected by a home security system when the cable outage is a result of a planned maintenance, versus an actual cable being physically severed.

Figure 1:
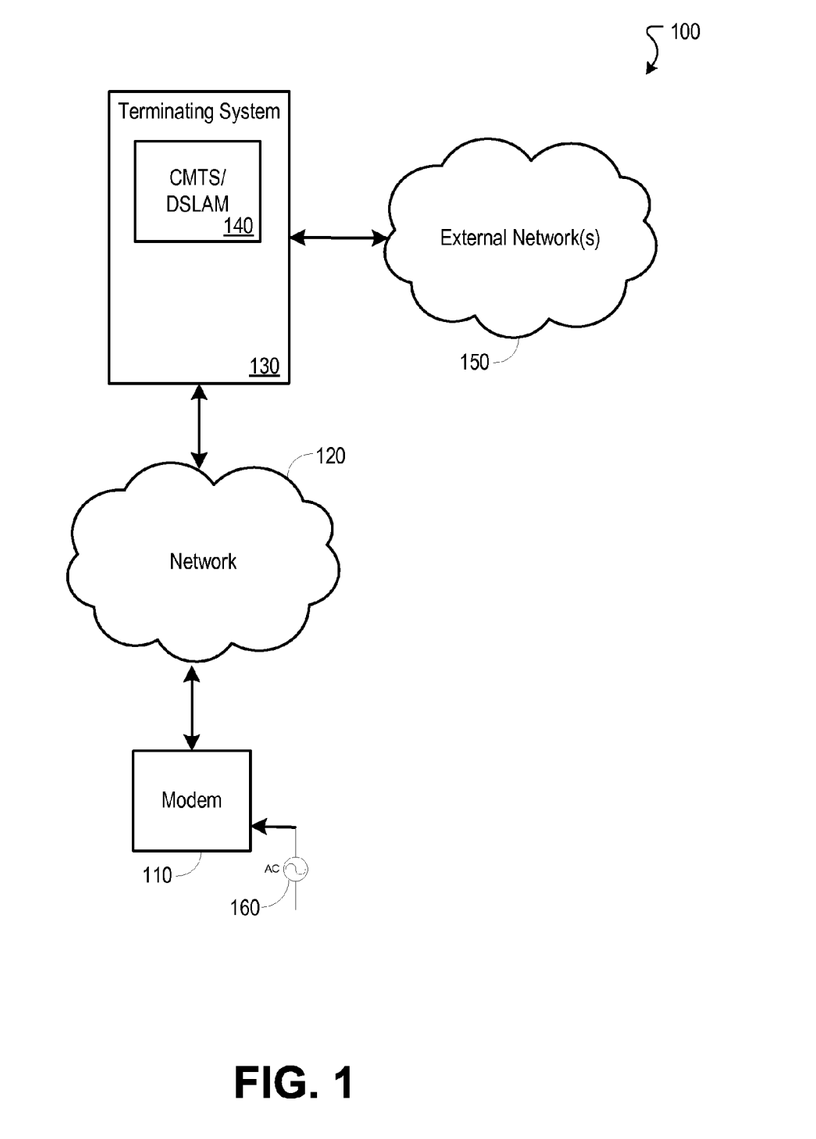
FIG. 1 is a block diagram illustrating an example network environment operable to provide power saving for broadband communications devices.

FIG. 1 is a block diagram illustrating an example network environment operable to provide broadband communications. In some implementations, an end user broadband communications device (BCD) 110 can be provided video, data and/or voice service(s) over a network 120 from a terminating device 130. The BCD 110 can be a networked device such as, for example, a cable modem (CM), enhanced multimedia terminal adapter (eMTA), digital subscriber line (DSL) modem, wireless modem, set-top box (STB), and gateway device, among others.

Moreover, the BCD 110 can be connected to an internal or external power source. The network 120 can be a wired or wireless access network including an HFC DOCSIS based community antenna television (CATV), digital subscriber line (DSL), fiber-to-the-premise (FTTP), WiMAX (i.e., 802.16), 3G/4G (i.e., third/fourth generation) network, or any combinations thereof. In some implementations, the network 120 can be a hybrid-fiber coax network that uses existing cable infrastructure to provide broadband services.

In some implementations, the termination system 130 can be a cable modem termination system (CMTS) 140 or digital subscriber line access multiplexer (DSLAM) 140. In other implementations, the termination system 130 can be a wireless access point and/or cellular phone tower. Termination systems 130 can connect to external network(s) 150 to provide access to the Internet, telephony systems, television broadcasts, among others.

The BCD 110 can communicate with other networked devices with a variety of physical and network protocols. The modem can be powered by external power via an AC outlet 160 and an internal battery for backup in the case of an external power 160 failure. In other implementations, a primary battery can be used in lieu of an external power 160 source.

Figure 2:
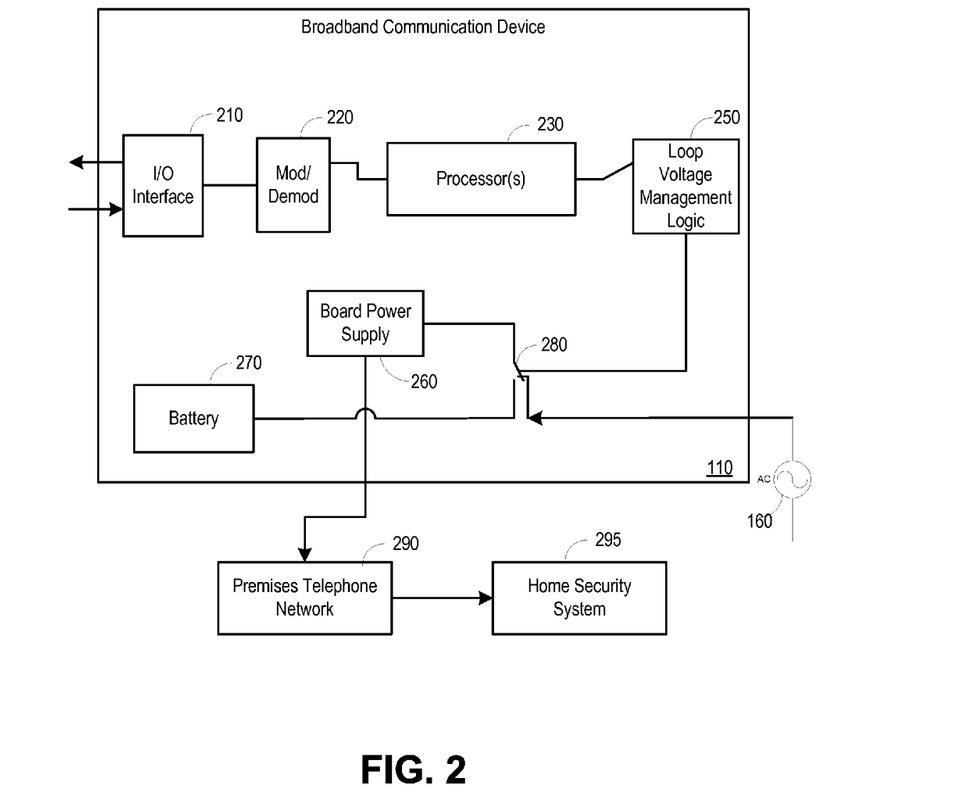
FIG. 2 is a block diagram illustrating an example broadband communications modem device.

FIG. 2 is a block diagram illustrating an example broadband communications device operable to maintain a loop voltage on an existing premises telephone network. The broadband communication device (e.g., BCD 110 of FIG. 1) can include an I/O interface 210, a mod/demod 220 module, one or more processor(s) 230, loop voltage management logic 250, a board power supply 260, a battery 270, a switch 280 and an interface to connect to external power 160. The I/O interface 210 can provide for receipt and transmission of communications via a network (e.g., network 120 of FIG. 1). In some implementations, the I/O interface 210 can be an HFC interface. In other implementations, the I/O interface 210 can be a traditional telephone line operable to provide asymmetrical DSL (ADSL). In still further implementations, the I/O interface 210 can be a wireless interface using 802.11x or WiMAX, among others.

Still referring to FIG. 2, a mod/demod 220 module can also be included in the BCD 110 and can operate to demodulate and/or modulate incoming or outgoing signals. In some implementations, the mod/demod 220 can connect to the I/O interface 210 and provide for manipulation of data signals. One or more processors 230 can operate to carry out general and/or specific processing for the BCD 110. The BCD 110 can also be connected to the premises telephone network 290 of a subscriber. This network can include the existing in-home telephone wiring.

As mentioned above, severing the telephone line wires entering a user's premises that connect with the premises telephone network, or cutting a cable, for example the coaxial cable of an HFC DOCSIS and PacketCable based community antenna television (CATV) network, that enters a user's premises can result in an alarm being triggered by a home security system. Referring to FIG. 2, in example implementations, a BCD 110 can be operative to maintain loop voltage on the premises telephone network 290. One or more software modules, such as loop voltage management logic 250, can be executed by one or more processors 230 to instruct a board power supply 260 of BCD 110 to apply the loop voltage to the premises telephone network 290. The premises telephone network 290 can be connected to a home security system 295. In the event that the communication medium is not intact (e.g., the cable has been cut), the input radio frequency signal is not present on the communications medium going into the I/O interface 210 of the BCD 110. Thus, the BCD 110 is no longer able to achieve a lock onto a signal, and the BCD 110 will discontinue maintaining the loop voltage on the premises telephone network 290. The home security system 295 can be programmed to trigger an alarm if it does not detect the loop voltage on the premises telephone network 290.

To address false alarms that may result from routine cable network maintenance resulting in a cutoff of an input signal into a BCD, the PacketCable standard employs the use of a "maintenance timer." PacketCable is a consortium founded by Cable Television Laboratories, Inc. (CableLabs), which has as its members MSOs. PacketCable defines standards for the delivery of voice, video, and multimedia services using a cable network. Built on top of the DOCSIS (Data Over Cable Service Interface Specifications) cable infrastructure, PacketCable networks use the Internet Protocol (IP) to enable a wide range of services, including Voice over IP (aka, VoIP, IP telephony), multimedia conferencing, interactive gaming, and general multimedia applications. A DOCSIS network having PacketCable extensions allows MSOs to provide data and voice traffic efficiently using a single high-speed, quality-of-service (QoS)-enabled broadband cable architecture.

The maintenance timer has a countdown value that can be set by an MSO that is used to instruct a BCD to maintain loop voltage on the premises telephone network 290 for a period of time, regardless of whether the BCD's input radio frequency signal is present on the cable or not. The MSO typically sets the countdown value when cable outages are expected due to planned maintenance on the cable system. When a planned outage occurs, the BCD will use the countdown value and keep a loop voltage on the telephone wiring of the premises telephone network for a period that is based on the countdown value. Thus, even if maintenance of the cable plant results in a five hour period in which a cable outage occurs, the BCD will maintain loop voltage on a customer's telephone wiring based on the value of the maintenance timer, which can specify a five hour time frame. This prevents a home alarm system from triggering an alarm due to an outage related to maintenance on the network.

PacketCable standards employ the use of the Simple Management Network Protocol (SNMP) to facilitate the exchange of management information for devices on the network. Network equipment managed by SNMP can implement a Management Information Base (MIB) having managed objects (sometimes called a MIB object). According to PacketCable standards, one such MIB object has a countdown value (the value of the maintenance timer) that is associated with the MIB maintained by a BCD, and in particular an eMTA. Before a scheduled outage occurs, the MSO can set the countdown value for the maintenance timer, which is communicated in an SNMP "SET" message to the BCD. The BCD stores the countdown value in its MIB and uses the value to apply loop voltage for a time based on the countdown value.

However, the PacketCable requirements for this countdown value state that "the eMTA MUST retain the value of this MIB Object (i.e., the countdown value) across soft resets. The eMTA MUST reset the value of this MIB Object (to its default value) during a hard reboot of the eMTA." Thus, a BCD 110, such as an eMTA, operating in compliance with the PacketCable standards will have a countdown value that must be reset during a hard reset. Other types of networks may have similar operational requirements. However, it should be understood that none of the aforementioned requirements are a requirement to practice the teachings of this disclosure.

The MSO can set a countdown value that the BCD uses to ignore cable outages for hours of planned maintenance. Hence, the MSO wants the BCD to maintain loop voltage unconditionally for this period of time. In some implementations the BCD can determine that the communications medium is intact by observing other communication signals (e.g., broadcast video), determining the impedance of the line, or communicating with a network element (e.g., amplifier, fiber node, etc. . . . ). Therefore, the BCD can continue to generate loop voltage in the absence of an input signal regardless of the countdown value state.

During the outage period, the BCD might experience a hard reset, which can be due to the end customer momentarily unplugging the BCD, a short power outage, or the reset button to the modem being pressed. In this situation, in accordance with the PacketCable standard, the countdown value is reset during the boot-up process. The countdown value assigned by the MSO to account for the outage period is no longer the value associated with the maintenance timer MIB object, and there is no value that will be interpreted by the BCD to maintain loop voltage for a certain amount of time. If the planned outage is still in place, a cable outage will be detected by the BCD. The BCD, which is using the reset value and not the maintenance timer countdown value set by the MSO, does not apply voltage to the telephone line of the premises telephone network, which can result in the home alarm system producing a false alarm.

An example of an algorithm that reduces the probability of a false alarm during hard resets operates as follows: when the MSO sets the maintenance timer countdown value and the BCD receives the countdown value and updates its MIB, the BCD also writes this value to nonvolatile storage. At regular intervals the appropriate amount of time is deducted from the stored value—thus keeping the stored value current. When the modem experiences a hard reset, the maintenance timer value can be initialized to the last value that was saved in nonvolatile storage, instead of being reset. Thus, a hard reset was made to appear to the loop voltage management logic as a soft reset, and a false alarm can be avoided. To preserve the life of the nonvolatile media (for example, flash memory has a lifetime limitation on write cycles), the interval at which the maintenance timer is written to nonvolatile storage can be made to be large enough to keep writes to a minimum. The interval can also be made to be small enough to avoid excessive granularity error in case of a hard reset to the modem. An interval value that can be interpreted as 30 minutes, for example, can be used.

An example implementation of the use of the nonvolatile storage of the countdown value is as follows. The MSO sets the countdown value to instruct the BCD to ignore cable outages for five hours for planned maintenance. This value is written to a nonvolatile storage medium. Each half hour the value in storage in the nonvolatile memory is decremented by an amount that can be interpreted by the BCD as 30 minutes. There is a short duration power outage during the MSO's maintenance window. The BCD experiences a hard reset. Upon reinitializing, the BCD retrieves the last saved countdown value in the nonvolatile memory and starts the maintenance timer using that value. Loop voltage is applied to the telephone line and a false alarm is avoided.

Figure 3:
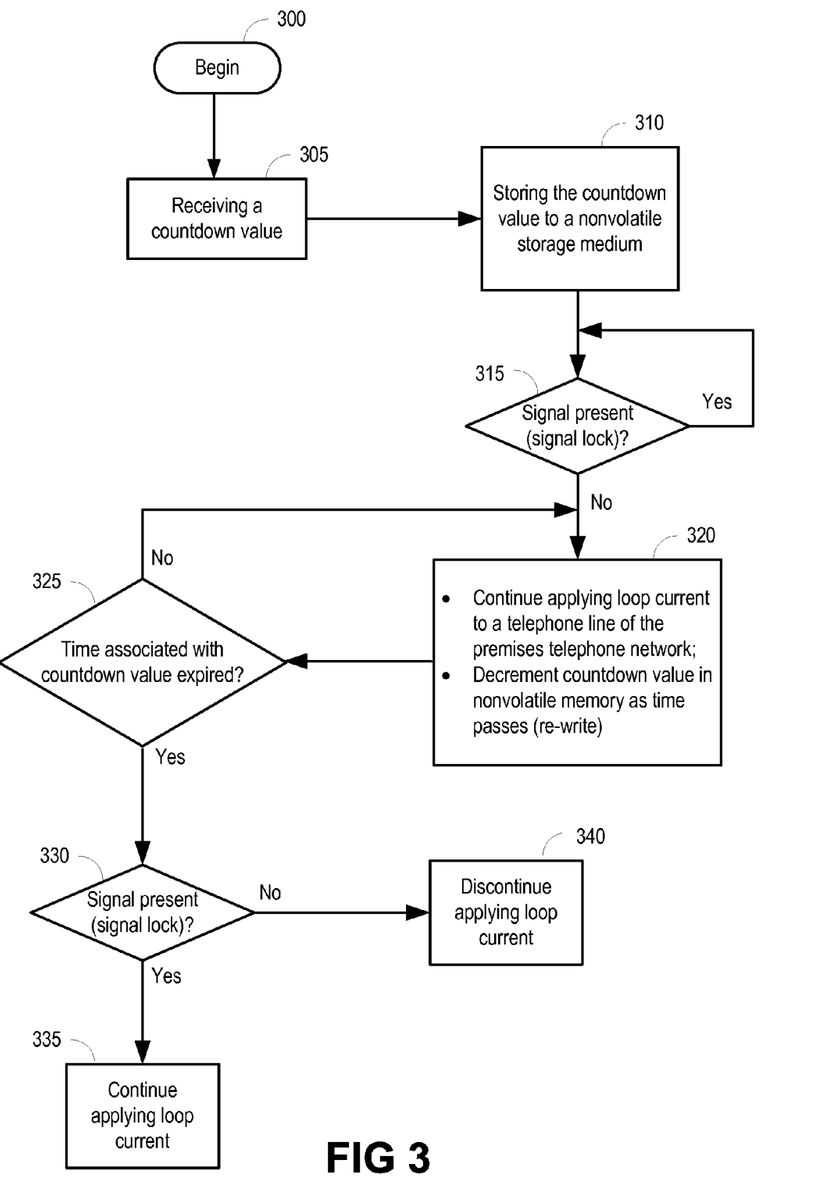
FIGS. 3 and 4 illustrate an example of an algorithm for operating the maintenance loop voltage timer.
Figure 4:
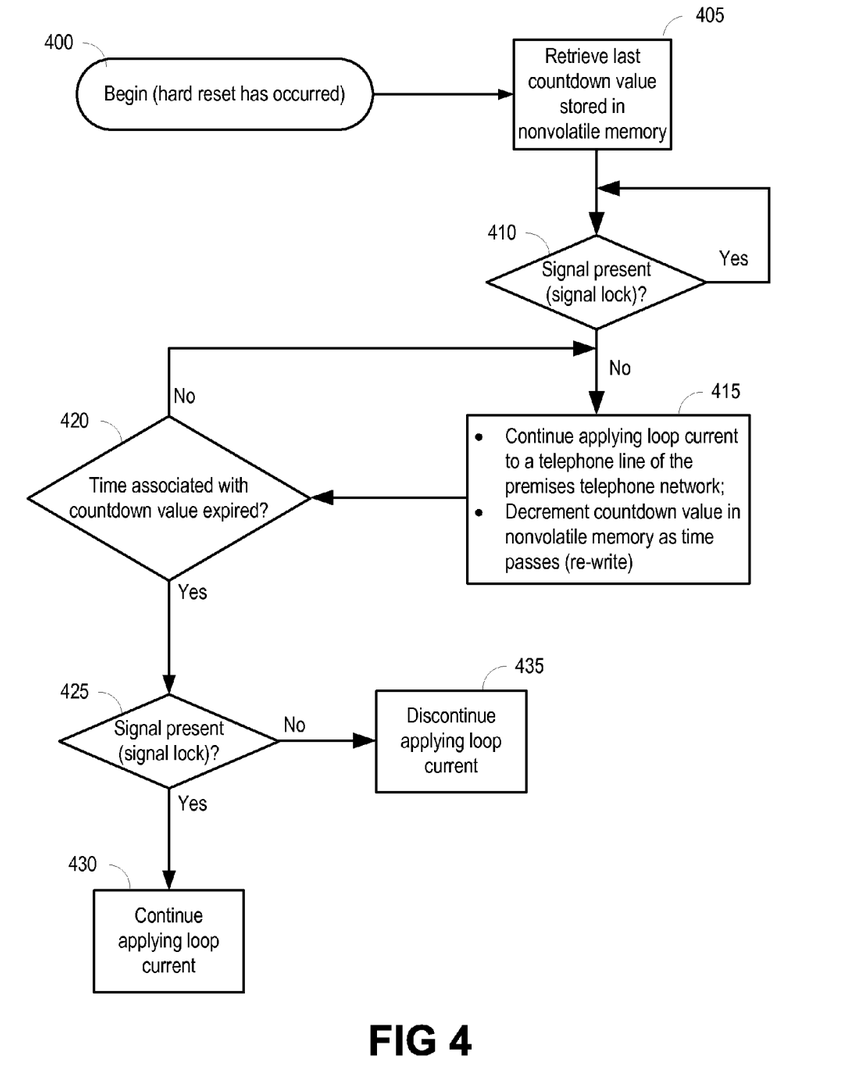

Referring to FIGS. 3 and 4, a BCD (e.g., BCD 110 of FIG. 1) can be operative to perform routines that use a non-volatile memory to store a countdown value. One or more software modules or logic (e.g., loop voltage management logic 250 of FIG. 1), can be executed by one or more processor(s) 230, to perform the example processes described in FIG. 3 and FIG. 4.

In FIG. 3, at stage 300, the process can begin. Maintenance of the network has been scheduled. One or more network management devices have sent a message containing a countdown value to a plurality of broadband communications devices connected to the network. At stage 305, the BCD receives the countdown value. At stage 310, the countdown value received via the message is stored in a nonvolatile memory, such as, for example, flash memory. At stage 315, the BCD determines the presence of signal lock. If no signal lock is detected the BCD proceeds to stage 320. At stage 320, the BCD applies a loop voltage to a telephone line of the premises telephone network based on the countdown value received. In the same or a parallel process, the countdown value in the nonvolatile memory is decremented at a chosen value, for example, a value corresponding to 30 minutes. If at stage 325 the time associated with the countdown value (which can be the maintenance window) has not expired, stage 320 will be performed again. If time associated with the countdown value has passed or expired, then the BCD at stage 330 attempts to lock on an incoming input signal from the network. If the BCD at stage 335 is unable to lock onto the incoming signal, at stage 340 the BCD discontinues applying a loop voltage to the telephone lines. If a home security system has been programmed to signal an alert (e.g., sound an alarm) based on the absence of a loop voltage, that security system will perform some action triggered by that alert.

In FIG. 4 the process begins at stage 400. A maintenance timer countdown value has been received, for example as in stage 405. The countdown value is then stored in a nonvolatile storage medium in stage 410. The BCD might have been applying loop voltage to the telephone lines for a specified amount of time during the maintenance window, and the countdown value stored in the nonvolatile memory might have been decremented already, based on the specified amount of time that has elapsed. Additionally, the BCD has experienced a hard reset. Upon reinitializing, at stage 405 the modem retrieves the last saved countdown value from the nonvolatile storage and starts the maintenance timer with that value. At stage 410, the BCD determines the presence of signal lock. If no signal lock is detected the BCD proceeds to stage 415. While the maintenance timer has not expired, the BCD at stage 415 applies a loop voltage to a telephone line of the premises telephone network based on the countdown value that was stored in the nonvolatile memory retrieved upon initialization. In the same or a parallel process, the countdown value in the nonvolatile memory is decremented at a chosen value, for example, a value corresponding to 30 minutes. If at stage 420 the time associated with the countdown value (which can be the remaining balance of the maintenance window) has not expired, stage 415 is performed again. If the time associated with the countdown value has passed or expired, then the BCD at stage 425 attempts to lock on an incoming input signal from the network. If the BCD at stage 430 is unable to lock onto the incoming signal, at stage 435 the BCD discontinues applying a loop voltage to the telephone lines. If a home security system has been programmed to send an alert based on the absence of a loop voltage, that security system will send an alert.

Figure 5:
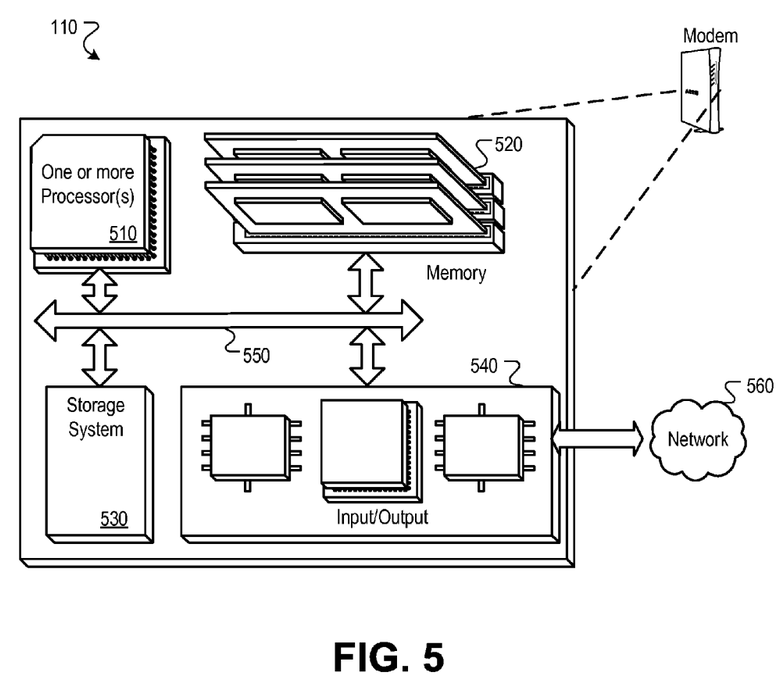
FIG. 5 is an example implementation of a block diagram of a broadband communications device 110 operable to maintain a countdown value after a hard reset.

FIG. 5 is an example implementation of a block diagram of a broadband communications device 110 operable to maintain a countdown value after a hard reset. The BCD 110 can include one or more processor(s) 510, a memory 520, a storage device 530, and an input/output device 540. Each of the modules 510, 520, 530, and 540 can, for example, be interconnected using a system bus 550. The processor(s) 510 is capable of processing instructions for execution within the system 110. In one implementation, the processor(s) 510 is a single-threaded processor(s). In another implementation, the processor(s) 510 is a multi-threaded processor(s). The processor(s) 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit. A non-volatile memory unit can store, for example, the countdown value set by the MSO.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a wireless interface, HFC network interface 560, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The device (e.g., a modem) of this disclosure, and modules thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor(s)" encompasses all apparatus, devices, and machines for processing data, including by way of example a programmable processor(s), a computer, or multiple processors or computers. The system processor(s) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, processor(s) will receive instructions and data from a read only memory or a random access memory or both. The components of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor(s) and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving a countdown value through a network;
   storing the countdown value in a nonvolatile storage;
   determining the condition of a network lock signal from a communication medium and performing the following steps if the network modulation lock signal is lost:
   a. retrieving the countdown value from the nonvolatile storage;
   b. using the countdown value retrieved from the nonvolatile storage and setting a maintenance time;
   c. continuing to apply a loop voltage to one or more telephony lines if the maintenance time has not elapsed; and
   d. if the maintenance timer has elapsed, and if no network modulation signal has been locked onto, then discontinue applying the loop voltage.

2. The computer-implemented method of claim 1, wherein the loop voltage is applied to the one or more telephone lines on loss of the network lock signal when determining the communication medium is intact regardless if the maintenance timer has elapsed.

3. The computer implemented method of claim 2, wherein the communication medium state is determined to be intact through observance of other communication signals.

4. The computer implemented method of claim 2, wherein the communication medium state is determined to be intact through communication with other network elements.

5. The computer implemented method of claim 2, wherein the communication medium state is determined to be intact through impedance measurements.

6. The computer-implemented method of claim 1, wherein the countdown value that is received through the network comprises an SNMP message.

7. The computer-implemented method of claim 1, wherein the countdown value is further stored as a MIB object value.

8. The computer-implemented method of claim 1, wherein the network comprises a cable network.

9. The computer-implemented method of claim 1, wherein the nonvolatile storage comprises a nonvolatile memory.

10. The computer-implemented method of claim 1, wherein the method of claim 1 is performed by a broadband communication device.

11. The computer-implemented method of claim 10, wherein the broadband communication device is a gateway device.

12. The computer-implemented method of claim 10, wherein the broadband communication device is a cable telephony modem.

13. One or more non-transitory computer-readable media having instructions stored thereon, the one or more computer readable media, when executed by a processor to perform operations comprising:
   detecting a hard reset;
   retrieving a countdown value from a nonvolatile storage;
   applying loop voltage to one or more telephone lines;
   determining the condition of a network lock signal and performing the following steps if the network lock signal is lost:
   a. decrementing the countdown value;
   b. storing the countdown value in the nonvolatile storage;
   c. determining if the countdown value has expired; and
   d. if the countdown value has expired, and a network modulation signal is not detected, then discontinue applying the loop voltage to the one or more telephone lines.

14. The one or more computer-readable media of claim 13 wherein, the processor is embedded within a multi-media broadband communication device.

15. The one or more computer-readable media of claim 14 wherein, the broadband communication device is a digital line subscriber based device.

16. The one or more computer-readable media of claim 14 wherein, the countdown value is stored and retrieved as a SNMP MIB object.

17. The one or more computer-readable media of claim 13 wherein, the network comprises a fiber optic network.

18. The one or more computer-readable media of claim 13 wherein, the network comprises a wireless network.

19. A system, comprising:
   a interface operable to provide a network connection;
   a demodulator operable to receive network signals and further operable to generate a network lock signal;
   a modulator operable to transmit network signals;
   one or more processors operable to process the network signals and provide control of a broadband communication device;

loop voltage management logic operable to provide loop voltage on a telephony line; and a board power supply operable to provide power to the broadband device from a first or second power source.

20. The system of claim 19 wherein, the loop voltage management logic maintains telephony line loop voltage through a hard reset cycle.

* * * * *